| United States Patent [19] | [11] | 4,337,236 |
|---|---|---|
| Sakowski et al. | [45] | Jun. 29, 1982 |

[54] PROCESS FOR MANUFACTURE OF CALCIUM HYPOCHLORITE

[75] Inventors: Walter J. Sakowski; John H. Shaffer; Larry G. Carty, all of Cleveland, Tenn.

[73] Assignee: Olin Corporation, New Haven, Conn.

[21] Appl. No.: 176,173

[22] Filed: Aug. 7, 1980

[51] Int. Cl.³ .............................................. C01B 11/06
[52] U.S. Cl. ............................... 423/474; 252/187.28; 252/186.21
[58] Field of Search ............................... 423/473, 474; 252/187 H

[56] References Cited

U.S. PATENT DOCUMENTS

| 1,583,421 | 5/1926 | Pistor | 423/474 |
|---|---|---|---|
| 1,713,650 | 5/1929 | George | 423/474 |
| 1,754,473 | 4/1930 | MacMullin | 423/474 |
| 1,937,613 | 12/1933 | Weber, Jr. | |
| 2,374,835 | 5/1945 | Robson | 423/474 |
| 3,094,380 | 6/1963 | Bruce | |
| 3,134,641 | 5/1964 | Gleichert | |
| 3,584,996 | 6/1971 | Hughes | 423/474 |
| 3,645,005 | 2/1972 | Dychdala | 423/474 |
| 4,196,184 | 4/1980 | Sakowski | |

FOREIGN PATENT DOCUMENTS 487009  6/1938  United Kingdom ................ 423/474

*Primary Examiner*—Brian E. Hearn
*Attorney, Agent, or Firm*—James B. Haglind; Donald F. Clements

[57] ABSTRACT

A novel process for the production of granular calcium hypochlorite compositions is provided which comprises reacting neutral calcium hypochlorite with an alkaline solution comprised of an alkali metal hypochlorite and an alkali metal hydroxide. The reaction produces a slurry from which a wet cake comprised of neutral calcium hypochlorite and a residual amount of hemibasic calcium hypochlorite is recovered and dried. During the drying process in which granular calcium hypochlorite compositions are obtained, there is a substantial reduction in the loss of available chlorine from the product.

9 Claims, No Drawings

PROCESS FOR MANUFACTURE OF CALCIUM HYPOCHLORITE

This invention relates to the manufacture of calcium hypochlorite. Calcium hypochlorite is a commercial bleaching and sanitizing agent used particularly in the disinfection of swimming pool waters.

Among the processes employed commercially for the production of calcium hypochlorite are several which produce neutral calcium hypochlorite, $Ca(OCl)_2$, in the anhydrous form, or as a hydrated product containing at least 4 percent of water. These widely employed processes have efficiently produced calcium hypochlorite compositions of high quality.

As energy costs have rapidly increased, ways have been sought to lower energy requirements for producing calcium hypochlorite, for example, by improving the drying of the product so that the loss of available chlorine during the drying stage is reduced.

In the past, methods for improving neutral calcium hypochlorite processes have included those which attempted to eliminate impurities such as calcium chloride from the product.

U.S. Pat. No. 1,713,650, issued May 21, 1929, to A. George and R. B. MacMullin, neutral calcium hypochlorite is treated with a sodium hypochlorite solution in an amount approximately equivalent to the calcium chloride present to reduce the calcium chloride concentration by converting it to neutral clacium hypochlorite.

In a similar process, as described in U.S. Pat. No. 1,713,654, issued May 21, 1929, to J. A. Guyer, the calcium chloride content in the neutral calcium hypochlorite is reduced by forming lime upon reaction with sodium hydroxide.

Alkali metal salts such as sodium hypochlorite, sodium hydroxide, sodium carbonate, or trisodium phosphate are used to reduce the calcium chloride concentration in a process for producing calcium hypochlorite by reacting lime with hypochlorous acid. The process, as described in U.S. Pat. No. 3,134,641, issued May 26, 1964, to R. D. Gleichert, is carried out while maintaining the pH of 10 to 10.5 in the reaction mixture.

While it is desirable, as shown by the above processes, to minimize the concentration of calcium chloride or other undesirable impurities, their elimination alone does not result in reduced energy requirements. Thus there is a need at the present time for an improved process for the production of calcium hypochlorite having lower energy requirements for drying.

It is an object of the present invention to provide a process for the production of calcium hypochlorite having a reduced loss of available chlorine during its drying.

Another object of the present invention is to provide a process for the production of calcium hypochlorite having improved filterability of the slurry form.

A further object of the present invention is to provide a process for the production of calcium hypochlorite having lower energy requirements.

These and other objects of the invention will be apparent from the following detailed description of the invention.

The novel process for the production of granular calcium hypochlorite compositions comprises:

(a) reacting neutral calcium hypochlorite with an alkaline solution comprised of an alkali metal hypochlorite and an alkali metal hydroxide to produce a slurry comprised of neutral calcium hypochlorite and a residual amount of hemibasic calcium hypochlorite, and (b) recovering a wet cake of the neutral calcium hypochlorite and the residual amount of hemibasic calcium hyprochlorite and drying the web cake to produce granular calcium hypochlorite compositions.

More in detail, the novel process of the present invention employs as one reactant a slurry of neutral calcium hypochlorite, usually in the dihydrate form. The slurry is substantially free of components which provide active residual alkalinity. Active residual alkalinity as used in the present specification is defined as the presence of $Ca(OH)_2$, hemibasic calcium hypochlorite, or dibasic calcium hypochlorite in the reactants or products. Neutral calcium hypochlorite slurries may be prepared by any of several processes including, for example, the triple salt process, the reaction of hypochlorous acid with a lime slurry, and the chlorination of dibasic calcium hypochlorite. In a preferred embodiment, the neutral calcium hypochlorite slurry is produced by the triple salt process. The triple salt process reacts a chlorinated lime slurry comprised of calcium hypochlorite and calcium chloride with a slurry of triple salt crystals having the formula $Ca(OCl)_2 \cdot NaOCl \cdot NaCL \cdot 12H_2O$. The lime slurry may be prepared, for example, by mixing lime having an active lime content of from about 85 to about 100, and preferably from about 90 to about 97 percent by weight with water to produce an aqueous lime slurry containing from about 10 to about 50, and preferably from about 15 to about 45 percent by weight of active lime. Active lime is defined by the amount of $Ca(OH)_2$ in the lime.

Typical illustrative specifications for an acceptable lime and for a preferred lime are as follows:

| Component | Acceptable | Preferred |
|---|---|---|
| $Ca(OH)_2$ min. % | 95.0 | 98 |
| $CaCo_3$ max. % | 1.0 | 0.8 |
| MgO max. % | 0.8 | 0.5 |
| $SiO_2$ max. % | 0.5 | 0.2 |
| $Fe_2O_3 + Al_2O_3$ max. % | 0.3 | 0.1 |
| $CaSO_4$ max. % | 0.3 | 0.05 |

The average particle size of lime employed in the process generally is substantially all $-325$ mesh (wet screen analysis) but particles up to about $-200$ mesh may be employed if desired. The lime slurry is fed to a reactor to which is also added chlorine in either gaseous or liquid form. The reactor may be any suitable chlorination apparatus provided with agitation means for maximum contact between chlorine and the lime slurry. A particularly suitable reactor is an evaporator-chlorinator of the type used in the chlorination process described in U.S. Pat. No. 3,241,912, issued to B. H. Nicolaisen on Mar. 22, 1966. During the chlorination, the temperature within the reactor is maintained within the range from about 0° to about 30° C. and preferably from about 20° to about 25° C. Chlorination of the lime slurry forms calcium hypochlorite and calcium chloride in accordance with Equation (1).

$$Ca(OH)_2 + Cl_2 \rightarrow \tfrac{1}{2}Ca(ClO)_2 + H_2O + \tfrac{1}{2}CaCl_2 \qquad (1)$$

Chlorination of the lime slurry is continued until substantially all of the active lime, $Ca(OH)_2$ is reacted. The chlorinated lime slurry produced is comprised of calcium hypochlorite and calcium chloride. The slurry is alkaline having a total residual alkalinity which includes inactive residual alkalinity provided by lime impurities such as calcium carbonate and magnesia and an active residual alkalinity as defined above. The active residual alkalinity in the slurry is less than 0.2 percent by weight.

The chlorinated lime slurry produced is reacted with a slurry of triple salt crystals, $Ca(OCl)_2 \cdot NaOCl \cdot NaCl \cdot 12H_2O$. Triple salt crystals are produced by the chlorination of a slurry of hydrated lime and a sodium hypochlorite solution where the reaction mixture is cooled to a temperature below about $-18°$ C. The crystals are separated from the reaction mixture, for example, by filtering. The crystals recovered are essentially neutral and have an active alkalinity content of less than 0.05 percent by weight. The triple salt crystals are admixed with the chlorinated lime slurry in amounts which provide sufficient concentrations of sodium hypochlorite to react with the calcium chloride present in the chlorinated lime slurry and reduce its concentration to less than about 0.5 percent by weight. Sodium hydrochlorite present in the triple salt crystals reacts with calcium chloride to produce a neutral calcium hypochlorite slurry comprised of said calcium hypochlorite dihydrate, $Ca(OCl)_2 \cdot 2H_2O$ and a solution containing sodium chloride.

This neutral slurry is admixed with an alkaline solution comprised of an alkali metal hypochlorite and an alkali metal hydroxide. Any suitable alkali metal hypochlorite may be used, for example, sodium hypochlorite, potassium hypochlorite, or lithium hypochlorite, with sodium hypochlorite being preferred. Similarly, alkali metal hydroxides which may be employed include sodium hydroxide, potassium hydroxide, or lithium hydroxide with sodium hydroxide being preferred. In order to simplify the disclosure, the alkaline solution of the invention will be described hereafter in terms of sodium hypochlorite and sodium hydroxide. To prevent undesired dilution of the reaction mixture, the concentration of the sodium hypochlorite is maintained in the range of from about 20 to about 32 and preferably from about 22 to about 30 percent by weight. The amount of sodium hydroxide present in the alkaline solution is sufficient to produce a residual amount of hemibasic calcium hypochlorite by reaction of the alkaline solution with neutral calcium hypochlorite in the slurry. Suitable amounts include from about 2 to about 20, and preferably from about 4 to about 20 percent by weight of sodium hydroxide. While the sodium hydroxide may be added to the hypochlorite solution as a solid, it is preferred to use a concentrated aqueous solution containing, for example, 50 percent by weight of NaOH.

The reaction is carried out at temperatures in the range of from about 22 to about 30° C., preferably at from about 25 to about 28° C.

The reaction mixture should be agitated in a manner which thoroughly admixes the alkaline solution with the slurry. This results in the production of small, fine crystals of hemibasic calcium hypochlorite which are thoroughly dispersed throughout the reaction mixture.

The reaction between the sodium hypochlorite solution containing sodium hydroxide and the calcium hypochlorite in the neutral slurry proceeds in accordance with Equations (2) and (3).

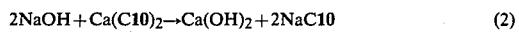

$$2NaOH + Ca(ClO)_2 \rightarrow Ca(OH)_2 + 2NaClO \qquad (2)$$

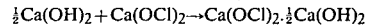

$$\tfrac{1}{2}Ca(OH)_2 + Ca(OCl)_2 \rightarrow Ca(OCl)_2 \cdot \tfrac{1}{2}Ca(OH)_2 \qquad (3)$$

After the reaction is completed, the slurry comprised of neutral calcium hypochlorite dihydrate, sodium chloride, and a residual amount of hemibasic calcium hypochlorite is subjected to a solid-liquid separation technique such as filtering or centrifuging to recover a moist cake of neutral calcium hypochlorite, hemibasic calcium hypochlorite, and sodium chloride. Where the moist cake is separated by filtering, the hemibasic calcium hypochlorite crystals presented increase the rate of filtration of the slurry over that of slurries produced in conventional processes for producing neutral calcium hypochlorite. The residual amount of hemibasic calcium hypochlorite present in the moist cake is in the range of from about 1 to about 4, and preferably from about 1.5 to about 2.5 percent by weight. The moist cake is conveyed to a dryer which is any suitable apparatus capable of reducing the moisture content of the calcium hypochlorite cake to the desired level without causing excessive decomposition of the calcium hypochlorite particles. During filtering, a filtrate is recovered which comprises a sodium chloride solution containing hypochlorite values. This filtrate may be recycled, for example, for use in the production of triple salt crystals.

By increasing the filtration rate, the process of the present invention provides increased productivity and permits a greater amount of calcium hypochlorite cake to be dried per unit of time resulting in a lower energy cost per unit of product.

During the drying process, the calcium hypochlorite cake undergoes substantially less decomposition than neutral calcium hypochlorite cakes produced, for example, by conventional processes, resulting in a higher available chlorine content in the dried product.

After drying, a calcium hypochlorite composition is obtained comprised of from about 60 to about 70 percent by weight of neutral calcium hypochlorite, from about 10 to about 20, and preferably from about 13 to about 16 percent by weight of hemibasic calcium hypochlorite to provide a total calcium hypochlorite concentration in the dry product of from about 65 to about 85, and preferably from about 70 to about 80 percent by weight. The water content is in the range of from about 0.5 to about 10 and preferably from about 5.0 to about 7.5 percent by weight. The remainder of the dry calcium hypochlorite composition is predominantly sodium chloride. The product is then placed in suitable containers, with or without prior size classification or other processing such as pelletizing, prior to use, for example, in the sanitation of water supplies.

The novel process of the invention may be conducted as a continuous process by producing the neutral hypochlorite slurry while simultaneously introducing controlled amounts of the alkaline solution of the alkali metal hypochlorite and alkali metal hydroxide. When operated as a batch process, for example, a chlorinated lime slurry is reacted in a first stage with a triple salt slurry to produce a slurry of neutral calcium hypochlorite dihydrate. This neutral calcium hypochlorite slurry is then reacted in a second stage to produce the calcium hypochlorite slurry comprised of neutral calcium hypochlorite, a residual amount of hemibasic calcium hypochlorite, and sodium chloride. The separation and drying of the calcium hypochlorite cake is carried out as described above.

In a preferred embodiment, the slurry of triple salt crystals is admixed with the chlorinated lime slurry in amounts which provide insufficient concentrations of sodium hypochlorite to completely react with the calcium chloride present in the chlorinated lime slurry. Sodium hypochlorite present in the triple salt crystals reacts with calcium chloride to produce neutral calcium hypochlorite. Unreacted calcium chloride concentrations are in the range of from about 2 about 5 and peferably from about 2.5 to about 3.5 percent by weight. The remaining calcium chloride concentration in the neutral calcium hypochlorite slurry is reacted with the sodium hypochlorite in the akaline solution to produce additional neutral calcium hypochlorite and reduce the concentration of $CaCl_2$ to less than about 0.5 percent by weight. The sodium hydroxide present in the alkaline solution reacts with neutral calcium hypochlorite present to produce the residual amount of hemibasic calcium hypochlorite as described above.

The following examples are presented to illustrate the invention more fully. All parts and percentages are by weight unless otherwise specified.

EXAMPLE 1

A solution of sodium hypochlorite (24 g) was mixed with 9.0 g of a 50 percent solution of sodium hydroxide to produce an alkaline sodium hypochlorite solution containing 22.19 percent NaOCl and 13.64 percent NaOH. The alkaline solution (33 g) was blended in a reactor equipped with a variable speed agitator with a neutral calcium hypochlorite slurry (490 g) containing less than 0.3 percent of calcium chloride, to form a final calcium hypochlorite slurry which contained 21.48 percent $Ca(OCl)_2$ and 0.25 percent NaOCl and had an active residual alkalinity of 8.27 percent in the form of hemibasic calcium hypochlorite. This paste was filtered to yield a calcium hypochlorite filter cake having a moisture content of 45.69 percent and an available chlorine content of 38.79 percent. The cake was dried in a vacuum oven at 100 mm Hg absolute pressure and 65° C. to produce a hydrated granular calcium hypochlorite product containing 6.6 percent water and 62.48 percent available chlorine (wet basis), indicating a loss on drying of 6.34 percent of the available chlorine (dry basis).

EXAMPLE 2

Triple salt crystals (500 g), having the formula $Ca(OCl)_2 \cdot NaOCl \cdot NaCl \cdot 12H_2O$ in which the NaOCl concentration was 9.12 percent, were blended with a chlorinated lime slurry having a calcium chloride concentration of 15.23 percent. A first calcium hypochlorite slurry was produced containing 28.29 percent $Ca(OCl)_2 \cdot 2H_2O$ and 3.21 percent $CaCl_2$. In a separate reactor, a solution of sodium hypochlorite (197 g) was mixed with 2.73 g of a 50 percent solution of sodium hydroxide to produce an alkaline sodium hypochlorite solution containing 29.61 percent NaOCl and 2.29 percent NaOH. The alkaline solution (90 g) was blended with the first calcium hypochlorite slurry to produce a slurry paste containing 28.42 percent $Ca(OCl)_2$ and 0.56 percent $CaCl_2$ and having an alkalinity of 2.87 percent in the form of hemibasic calcium hypochlorite, $Ca(OCl)_2 \cdot \frac{1}{2}Ca(OH)_2$. The final paste was filtered to yield a calcium hypochlorite filter cake having a moisture content of 45.16 percent and an available chlorine content of 43.25 percent. The cake was dried in a vacuum oven at 100 mm Hg absolute pressure and 65° C. to produce a granular product containing 8.2 percent water and 69.57 percent available chlorine (wet basis), indicating a loss on drying of 3.91 percent of available chlorine (dry basis).

COMPARATIVE EXAMPLE A

Triple salt crystals (500 g) of the formula $Ca(OCl)_2 \cdot NaOCl \cdot NaCl \cdot 12H_2O$ containing 10.53 percent NaOCl were mixed with 333 g of a chlorinated lime slurry containing 13.04 percent $CaCl_2$ to produce a calcium hypochlorite paste containing 22.98 percent $Ca(OCl)_2$ and 0.22 percent $CaCl_2$. The calcium hypochlorite paste was filtered to provide a filter cake having a moisture content of 44.93 percent and an available chlorine content 42.71 percent. The filter cake was dried in a vacuum oven at 100 mm Hg absolute pressure and 65° C. to produce a granular product containing 67.89 percent of available chlorine (dry basis) indicating a loss on drying of 12.46 percent of available chlorine (dry basis).

Using the novel process of Examples 1 and 2 resulted in a reduction of 49% and 69% respectively in the loss of available chlorine during drying when compared with the prior art process of Comparative Example A.

EXAMPLE 3

A solution of sodium hypochlorite (187 g) was mixed with 12.9 g of a 50 percent solution of sodium hydroxide to produce an alkaline sodium hypochlorite solution containing 30.38 percent NaOCl and 4.66 percent NaOH. The alkaline solution (122 g) was blended in a reactor having a variable speed agitator with a chlorinated lime slurry (449 g) having a calcium chloride concentration of 15.72 percent, and triple salt crystals (500 g), having the formula $Ca(OCl)_2 \cdot NaOCl \cdot NaCl \cdot 12H_2O$, in which the NaOCl concentration was 10.93 percent. A calcium hypochlorite paste was produced which contained 26.53 percent $Ca(OCl)_2$ and 0.40 percent $CaCl_2$ and had an alkalinity of 2.34 percent in the form of hemibasic calcium hypochlorite. The final paste was filtered to yield a calcium hypochlorite filter cake having a moisture content of 51.87 percent and an available chlorine of 37.78 percent. The cake was dried in a vacuum oven at 100 mm Hg absolute pressure and 65° C. to produce a granular product containing 73.22 percent available chlorine (dry basis) indicating a loss on drying of 6.72 percent of available chlorine (dry basis).

What is claimed is:

1. A process for the production of granular calcium hypochlorite compositions which comprises:
   (a) reacting neutral calcium hypochlorite with an alkaline solution comprised of an alkali metal hypochlorite and an alkali metal hydroxide, the concentration of said alkali metal hypochlorite being from about 20 to about 32 percent by weight and the concentration of said alkali metal hydroxide being from about 2 to about 20 percent by weight, to produce a slurry comprised of neutral calcium hypochlorite and a residual amount of hemibasic calcium hypochlorite, and
   (b) recovering a wet cake of said neutral calcium hypochlorite and said residual amount of hemibasic calcium hypochlorite and drying said wet cake to produce granular calcium hypochlorite compositions, comprised of said neutral calcium hypochlorite and from about 10 to about 20 percent by weight of hemibasic calcium hypochlorite.

2. The process of claim 1 in which said alkali metal hypochlorite is selected from the group consisting of sodium hypochlorite, potassium hypochlorite, and lithium hypochlorite.

3. The process of claim 2 in which said alkali metal hydroxide in said alkaline solution is selected from the group consisting of sodium hydroxide, potassium hydroxide, and lithium hydroxide.

4. A process for the production of granular calcium hypochlorite compositions which comprises:
(a) reacting a chlorinated lime slurry comprised of calcium hypochlorite and calcium chloride with a slurry of triple salt crystals, and an alkaline solution comprised of an alkali metal hypochlorite and an alkali metal hydroxide to produce a calcium hypochlorite slurry comprised of neutral calcium hypochlorite, sodium chloride, and a residual amount of hemibasic calcium hypochlorite, and
(b) recovering a wet cake of said neutral calcium hypochlorite, said sodium chloride, and said residual amount of hemibasic calcium hypochlorite and drying said wet cake to produce granular calcium hypochlorite compositions comprised of said neutral calcium hypochlorite and having from about 10 to about 20 percent by weight of said hemibasic calcium hypochlorite.

5. The calcium hypochlorite compositions produced by the process of claim 4.

6. A process for the production of calcium hypochlorite compositions which comprises:
(a) chlorinating an aqueous slurry of lime to produce a chlorinated lime slurry comprised of calcium hypochlorite and calcium chloride,
(b) reacting said chlorinated lime slurry with crystals of a triple salt comprised of $Ca(OCl)_2 \cdot NaOCl \cdot NaCl \cdot 12H_2O$ to produce a first calcium hypochlorite slurry comprised of neutral calcium hypochlorite, sodium chloride and calcium chloride, said calcium chloride being present in an amount from about 2 to about 5 percent by weight,
(c) reacting said first calcium hypochlorite slurry with an alkaline solution comprised of sodium hypochlorite containing from about 2 to about 20 percent by weight of sodium hydroxide to form a second calcium hypochlorite slurry comprised of neutral calcium hypochlorite, sodium chloride, and a residual amount of hemibasic calcium hypochlorite, and
(d) recovering a wet cake of said neutral calcium hypochlorite, said sodium chloride and said residual amount of hemibasic calcium hypochlorite and drying said wet cake to produce granular calcium hypochlorite compositions comprised of said neutral calcium hypochlorite and from about 10 to 20 percent by weight of said hemibasic calcium hypochlorite.

7. The process of claim 1 or claim 4 or claim 6 in which said granular hypochlorite compositions have a water content in the range of from about 5.0 to about 7.5 percent by weight.

8. The process of claims 4 or 6 in which said chlorinated lime slurry has an active residual alkalinity content of less than 0.2 percent by weight.

9. The process of claim 1 or claim 4 in which said alkali metal hypochlorite is sodium hypochlorite and said alkali metal hydroxide is sodium hydroxide.

* * * * *

UNITED STATES PATENT OFFICE
CERTIFICATE OF CORRECTION

PATENT NO. : 4,337,236

DATED : June 29, 1982

INVENTOR(S) : Walter J. Sakowski, John H. Shaffer and Larry G. Carty

It is certified that error appears in the above-identified patent and that said Letters Patent are hereby corrected as shown below:

In Column 1, line 30, after "neutral" delete "clacium" and insert --calcium--.

In Column 2, line 6, after "calcium" delete "hyprochlorite" and insert --hypochlorite--.

In Column 2, line 6, after "the" delete "web" and insert --wet--.

In Column 2, line 26, after "formula" delete "Ca(OCl)$_2$.NaOCl.NaCL.12H$_2$O" and insert --Ca(OCl)$_2$ · NaOCl · NaCl · 12H$_2$O--.

In Column 3, lines 9-10, after "crystals," delete "Ca(OCl)$_21$.NaOCL.NaCl.12H$_2$O" and insert --Ca(OCl)$_2$ · NaOCl · NaCl · 12H$_2$O--.

In Column 3, line 26, after "dihydrate,", delete "Ca(OCl)$_2$.2H$_2$O" and insert --Ca(OCl)$_2$ · 2H$_2$O--.

In Column 3, line 67, Equation (2), delete "2NaOH+Ca(ClO)$_2$ $\rightarrow$ Ca(OH)$_2$+2NaClO" and insert --2NaOH + Ca(ClO)$_2$ $\rightarrow$ Ca(OH)$_2$ + 2NaClO--.

UNITED STATES PATENT OFFICE
CERTIFICATE OF CORRECTION

Page 2 of 3

PATENT NO. : 4,337,236

DATED : June 29, 1982

INVENTOR(S) : Walter J. Sakowski, John H. Shaffer and Larry G. Carty

It is certified that error appears in the above-identified patent and that said Letters Patent are hereby corrected as shown below:

In Column 5, lines 47-48, delete "$Ca(OCl)_2.NaOCl.NaCl.12H_2O$" and insert --$Ca(OCl)_2 \cdot NaOCl \cdot NaCl \cdot 12H_2O$--.

In Column 5, lines 52-53, delete "$Ca(OCl)_2.2H_2O$" and insert --$Ca(OCl)_2 \cdot 2H_2O$--.

In Column 5, lines 62-63, delete "$Ca(OCl)_2.\frac{1}{2}Ca(OH)_2$" and insert --$Ca(OCl)_2 \cdot \frac{1}{2}Ca(OH)_2$--.

In Column 6, lines 6-7, delete "$Ca(OCl)_2.NaOCl.NaCl.12H_2O$" and insert --$Ca(OCl)_2 \cdot NaOCl \cdot NaCl \cdot 12H_2O$--.

In Column 6, lines 33-34, delete "$Ca(OCl)_2.NaOCl.NaCl.12H_2O$" and insert --$Ca(OCl)_2 \cdot NaOCl \cdot NaCl \cdot 12H_2O$--.

In Column 7, Claim 4, part (a), lines 14-15, after "calcium" delete "hypochloride" and insert --hypochlorite.--

UNITED STATES PATENT OFFICE
CERTIFICATE OF CORRECTION

PATENT NO. : 4,337,236

DATED : June 29, 1982

INVENTOR(S) : Walter J. Sakowski, John H. Shaffer and Larry G. Carty

It is certified that error appears in the above-identified patent and that said Letters Patent are hereby corrected as shown below:

In Columns 7-8, Claim 6, part (b), line 33, after "of" (second occurrence), delete "$Ca(OCl)_2.NaOCl.NaCl.12H_2O$" and insert --$Ca(OCl)_2 \cdot NaOCl \cdot NaCl \cdot 12H_2O$--.

Signed and Sealed this

Sixteenth Day of November 1982

[SEAL]

Attest:

GERALD J. MOSSINGHOFF

Attesting Officer     Commissioner of Patents and Trademarks